Dec. 17, 1935.    O. M. DAHL    2,024,148
MOTOR VEHICLE
Filed April 19, 1934
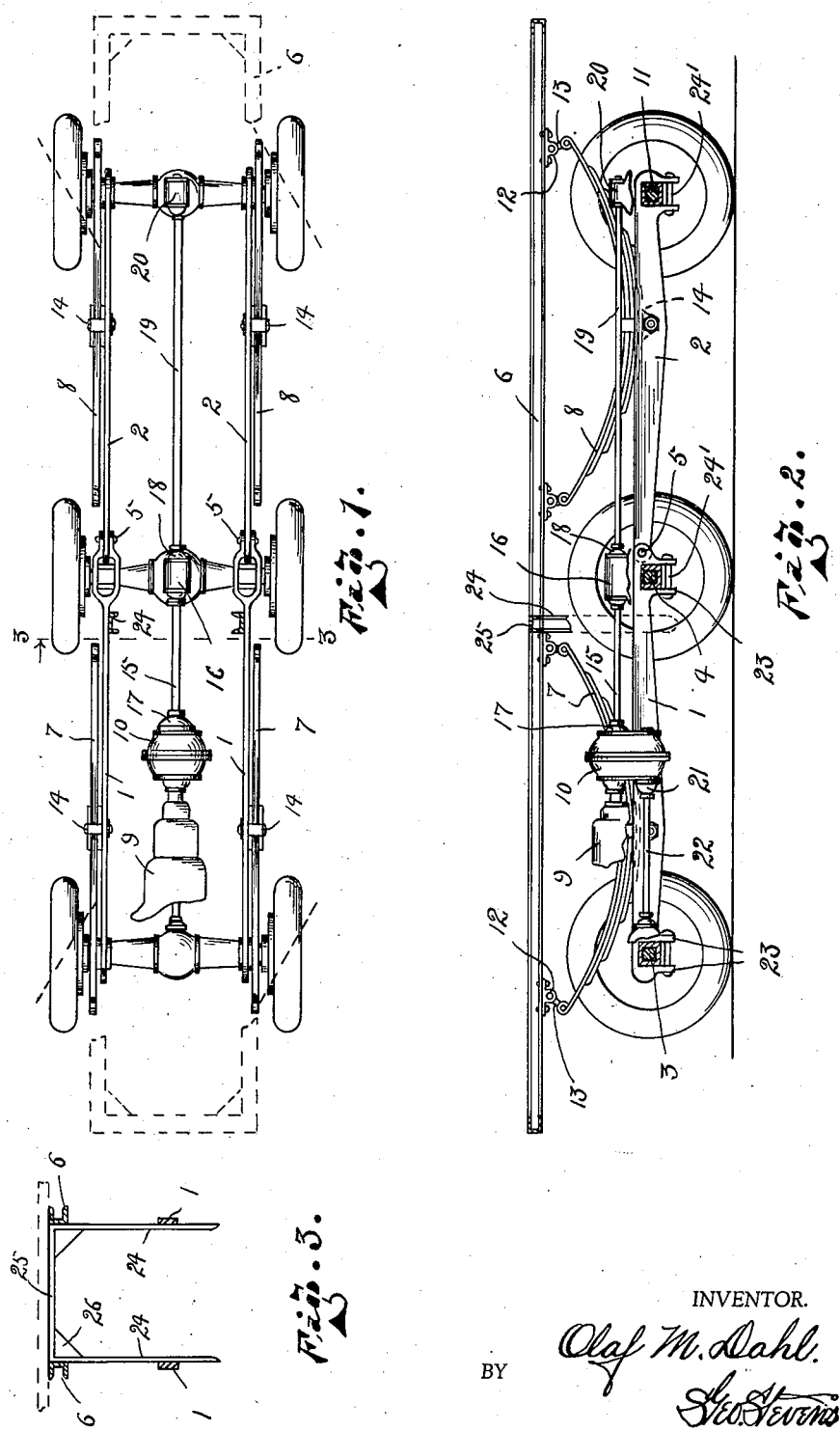
INVENTOR.
Olaf M. Dahl.
BY
Geo Stevens.
ATTORNEY.

Patented Dec. 17, 1935

2,024,148

UNITED STATES PATENT OFFICE 2,024,148

MOTOR VEHICLE

Olaf M. Dahl, Duluth, Minn.

Application April 19, 1934, Serial No. 721,344

1 Claim. (Cl. 280—106.5)

This invention relates to motor vehicles and has particular reference to one having six wheels, the front and rear sets of which are provided with steering means, and it is an object of the invention to provide means whereby power may be applied to all axles, driving them simultaneously, which, as will be readily apparent, is a marked advantage when such a vehicle encounters icy or slippery roads, or loose sand causing slipping of wheels with consequent loss of traction.

It is another object of my present invention to provide a chassis frame for such a six-wheeled vehicle which is pivoted between the intermediate and rear axles thereby permitting the latter to move on such pivot upwardly or downwardly and thus prevent the pitching which would otherwise occur were the frame rigid from end to end.

Other objects and advantages of the invention will appear in the following description thereof.

Referring now to the accompanying drawing, illustrating one practical embodiment of the invention, and wherein like reference characters indicate like parts:

Figure 1 is a top plan view of my improved chassis frame.

Figure 2 is a longitudinal section partly broken away.

Figure 3 is a transverse section on the line 3—3, Figure 1.

In the drawing the numerals 1 and 2 represent the improved two-part chassis-frame, the part 1 being that which is mounted upon the forward axle 3 and the intermediate axle 4, and the part 2 being pivotally attached to the rearmost end of the part 1 as at 5 and extending to and being mounted upon the rear axle 11; these two parts being so pivotally mounted upon either side to permit of independent vertical movement of the two parts of the frame.

6 represents the body frame which may be mounted in any accepted manner as for example by the semi-elliptical leaf springs indicated at 7 and 8, there being, of course, four or more of such springs, if such design is employed. Eye clips are shown at 12 secured to the under face of the body frame in properly spaced relation to support the spring shackles indicated at 13, in which the ends of the springs are mounted. Other eye clips are shown at 14, they being mounted in suitable holes in the chassis frame, and in which clips 14 are supported the usual U-bolts extending about the central portion of the springs and thereby holding them securely to the chassis frame.

9 represents a fractional portion of the transmission of the vehicle engine, and 10 indicates a housing for a suitable auxiliary transmission in providing uniform power for transmission to all three of the axles 3, 4, and 11. From this auxiliary transmission I have illustrated the driving shaft 15 as extending rearwardly to the worm driving gear housing 16 superposed upon the differential of the intermediate axle and by means of which power is transmitted to the intermediate axle and wheels thereupon. This type of differential is common in motor vehicle construction, and therefore it is not deemed essential to further illustrate or describe it herein; its function being well known to those versed in the art.

A universal joint is indicated at 17, at the rear of the housing 10 and connecting the forward end of the shaft 15, and another similar universal joint is indicated at 18, connecting the forward end of the shaft 19 for transmitting power to the worm driving gear housing 20 mounted upon the differential of the rear axle 11 for transmitting power to the rear wheels of the vehicle.

Still another universal joint is indicated at 21, it connecting with the rear end of the shaft 22 which extends forwardly to the differential of the front axle 3, transmitting power thereto for driving the front wheels of the vehicle.

Obviously the shaft 22 would revolve in a direction opposite to that of the shaft 15 so as to rotate all wheels in the same direction.

The ends of the member 1 of the two-part chassis frame are forked as indicated at 23, providing a somewhat arch-bar effect, and which forked ends straddle the front and intermediate axles as clearly shown, and the rear ends of the parts 2 of the chassis frame are similarly formed for straddling the rear axle and bolts 24' extend through holes in the forked ends to hold the frame securely to the axles, and any of which bolts may be removed for the disassembly of its respective axle.

It is to be understood that any desired form of transverse or diagonal bracing may be employed for strengthening of the sections 1 and 2, and, for cooperation with such reinforcing means of the body frame 6, I have provided the depending channel like structure shown in Figure 3 of the drawing, the same being preferably constructed of a continuous channel bar, the depending side portions thereof being indicated at 24 and the transverse portion intermediate of the side members of the body frame 6 being indicated at 25, and there may be provided in the upper corners thereof as at 26 gusset plates or brackets to reinforce same. The entire device is bolted or otherwise secured to the body frame 6 with the depending lugs 24 in constant engagement with the side members of the frame 1, and there may be provided a similar cooperating reinforcing member in connection with the portion 2 of the chassis frame.

Having thus described my invention, what I claim and desire to secure by Letters Patent, is:

In combination, three horizontally spaced vehicle axles, a two-part pivotally united unsprung chassis frame supported by said axles, a sprung body frame supported upon said chassis frame, and means accessible from the under side of said chassis frame and associated with each axle whereby any one of said axles may be dropped from engagement with the chassis frame without elevation of any other axle engaged portion of said frame.

OLAF M. DAHL.